United States Patent
Andrew et al.

(10) Patent No.: US 11,886,400 B2
(45) Date of Patent: Jan. 30, 2024

(54) ACHIEVING AND MAINTAINING SCALABLE HIGH QUALITY UPSTREAM STRATIGRAPHIC PICKS DATA

(71) Applicant: Saudi Arabian Oil Company, Dhahran (SA)

(72) Inventors: Adeola Taiwo Andrew, Dhahran (SA); Zafar Tasleem Minhas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 43 days.

(21) Appl. No.: 17/644,319

(22) Filed: Dec. 14, 2021

(65) Prior Publication Data
US 2023/0185784 A1 Jun. 15, 2023

(51) Int. Cl.
G06F 16/215 (2019.01)
G06F 16/23 (2019.01)

(52) U.S. Cl.
CPC ........ *G06F 16/215* (2019.01); *G06F 16/2379* (2019.01)

(58) Field of Classification Search
CPC ............................ G06F 16/215; G06F 16/2379
USPC ........................................................ 707/692
See application file for complete search history.

(56) References Cited

U.S. PATENT DOCUMENTS

| | | | |
|---|---|---|---|
| 7,280,932 B2 | 10/2007 | Zoraster et al. | |
| 7,319,961 B2 | 1/2008 | Al-Dhubaib et al. | |
| 8,473,450 B2 | 6/2013 | Bakalash et al. | |
| 10,140,352 B2 | 11/2018 | Hariharan et al. | |
| 10,936,561 B2 | 3/2021 | Hiu et al. | |
| 11,333,792 B1* | 5/2022 | Lemons | G01V 99/005 |
| 11,360,951 B1* | 6/2022 | Gilderman | G06F 16/2379 |
| 2008/0307262 A1* | 12/2008 | Carlin, III | G06F 16/215 |
| | | | 714/E11.002 |
| 2011/0320182 A1* | 12/2011 | Dommisse | G01V 1/34 |
| | | | 703/10 |
| 2013/0035863 A1* | 2/2013 | Selman | E21B 43/26 |
| | | | 702/9 |

(Continued)

FOREIGN PATENT DOCUMENTS

FR 3026521 A1 4/2016

OTHER PUBLICATIONS

Yang; Geobiodiversity Database: A Comprehensive Section-Based Integration Of Stratigraphic And Paleontological data; Aug. 2013.

*Primary Examiner* — Cam T Nguyen
(74) *Attorney, Agent, or Firm* — Leason Ellis LLP

(57) ABSTRACT

Stratigraphic picks data from at least one first database are processed to ensure conformance with data conditions. The stratigraphic picks data can be filtered by removing at least some of the stratigraphic picks data that does not conform with the data conditions to generate filtered stratigraphic picks data. At least some data in a second database that matches at least some of the filtered stratigraphic picks data is identified. The identified at least some data can be processed to remove the identified at least some data from the second database, and to process the filtered stratigraphic picks data to add the filtered stratigraphic picks data to the second database. Further, a report can be generated identifying any of the filtered stratigraphic picks data that were successfully added to the second database and any of the stratigraphic data that were not successfully added to the second database.

20 Claims, 7 Drawing Sheets

(56) References Cited

U.S. PATENT DOCUMENTS

| | | | |
|---|---|---|---|
| 2013/0232158 A1 | 9/2013 | Heggelund et al. | |
| 2013/0346394 A1* | 12/2013 | Ludvigsen | G06F 16/248 |
| | | | 707/722 |
| 2014/0000964 A1* | 1/2014 | Selman | E21B 44/00 |
| | | | 175/24 |
| 2014/0081613 A1* | 3/2014 | Dommisse | G01V 1/345 |
| | | | 703/10 |
| 2014/0188892 A1* | 7/2014 | Ludvigsen | G06Q 50/01 |
| | | | 707/741 |
| 2015/0106018 A1* | 4/2015 | Robinson | G01V 11/00 |
| | | | 702/11 |
| 2015/0241591 A1* | 8/2015 | Burmester | G01V 11/00 |
| | | | 702/7 |
| 2016/0253767 A1* | 9/2016 | Langenwalter | E21B 49/00 |
| | | | 705/7.38 |
| 2017/0060913 A1* | 3/2017 | Kjeilen-Eilertsen | |
| | | | G06F 16/2365 |
| 2019/0034812 A1* | 1/2019 | Borrel | G01V 99/005 |
| 2019/0361146 A1* | 11/2019 | Roth | G01V 1/50 |
| 2020/0332627 A1 | 10/2020 | Tang et al. | |
| 2020/0378248 A1 | 12/2020 | Maus et al. | |
| 2021/0166166 A1 | 6/2021 | Foubert et al. | |

\* cited by examiner

FIG. 5

ACHIEVING AND MAINTAINING SCALABLE HIGH QUALITY UPSTREAM STRATIGRAPHIC PICKS DATA

FIELD OF THE DISCLOSURE

This patent application relates, generally, data processing and management and, more particularly, to achieving and maintaining high quality stratigraphic picks data.

BACKGROUND OF THE DISCLOSURE

Increased energy exploration activities have led to a high volume of exploration data, including stratigraphic picks data. Unfortunately, there has not been effective and structured methodologies for loading and processing stratigraphic pick data efficiently. Problems remain concerning processing stratigraphic picks data accurately and quickly. As used herein, a "stratigraphic pick" refers, generally, to a top or bottom of a formation separating two different geological layers. Data structures associated with stratigraphic picks can be highly complex, and processing stratigraphic picks data, for example, to characterize reservoirs is expensive and time-consuming. In addition, stratigraphic picks data are often incomplete, inaccurate, or unavailable, which negatively affect processing and results thereof.

It is with respect to these and other concerns that the present disclosure is provided.

SUMMARY OF THE DISCLOSURE

In one or more implementations, a method and system for processing stratigraphic picks data are disclosed. At least one computing device configured by executing instructions can process stratigraphic picks data from at least one first database to ensure conformance with a plurality of data conditions. Further, the at least one computing device can filter the stratigraphic picks data by removing at least some of the stratigraphic picks data that does not conform with at least one of the plurality of data conditions to generate filtered stratigraphic picks data. Moreover, the at least one computing device can identify at least some data in a second database that matches at least some of the filtered stratigraphic picks data. The at least one computing device can be further configured to process the identified at least some data to remove the identified at least some data from the second database, and to process the filtered stratigraphic picks data to add the filtered stratigraphic picks data to the second database. Further, the at least one computing device can generate a report identifying any of the filtered stratigraphic picks data that were successfully added to the second database and any of the stratigraphic data that were not successfully added to the second database.

In one or more implementations, the at least one computing device can be configured to update at least some of the stratigraphic picks data with information missing in the at least some of the stratigraphic picks data.

In one or more implementations, the information includes at least one of reference elevation information and deviation survey data.

In one or more implementations, the stratigraphic picks data includes core data and log data.

In one or more implementations, the filtering further comprises removing, by the at least one computing device, duplicate stratigraphic picks data.

In one or more implementations, the stratigraphic picks data are accessed by the at least one computing device from the at least one database over a data communication network.

In one or more implementations, the stratigraphic picks data are accessed by the at least one computing device from a data file.

In one or more implementations, processing the identified at least some data to remove the identified at least some data from the second database can include determining, by the at least one computing device, an error that occurred in the second database, and generating, by the at least one computing device, a report identifying the error.

In one or more implementations, processing the filtered stratigraphic picks data to add the filtered stratigraphic picks data to the second database further comprises determining an error that occurred in the second database and generating a report identifying the error.

In one or more implementations, the plurality of data conditions include at least one of: no duplicate stratigraphic picks data; a well associated with any of the stratigraphic picks data has a reference elevation; any of the stratigraphic picks data has an interpreter id; pick depth associated with any respective stratigraphic picks data is between the top and bottom depth of a wellbore associated with the respective stratigraphic picks data; and observation number associated with respective stratigraphic picks data is recognizable.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 5 shows an example graphical user interface that includes options for a user to choose a project prior and search to the user logging in by submitting authorization information

DETAILED DESCRIPTION OF CERTAIN EMBODIMENTS ACCORDING TO THE DISCLOSURE

By way of overview and introduction, the present disclosure presents technical method(s) and system(s) which provide integrated solutions to improve stratigraphic picks data quality and use. Systems and methodologies are provided to ensure data accuracy, improve data delivery times, and reduce or prevent data errors substantially in real-time during processing. Moreover, instructions stored on processor-readable media, when executed by one or more computing devices, automate a process of transferring stratigraphic picks from one or more "project" databases into a "corporate database."

As used herein, a "project database" refers, generally, to a database that includes data representing the well, wellbore, depth of the stratigraphic markers, and the name of the stratigraphic marker. Once data in an application, i.e. project data, are reviewed and agreed upon, the data are copied to a "corporate database." The corporate database holds the final agreed upon information about a stratigraphic marker. The Project database can be considered as the database that stores work-in-progress, and the corporate database stores the finally agreed upon data. In practice, data are copied from the project database to the corporate database.

In one or more implementations, a computer-implemented system and method are provided that include instructions that, when executed by one or more processors, configure a computing device to access stratigraphic picks data from one or more databases, files, or other data source. The data can be analyzed and processed to ensure validity and completeness and, thereafter, transmitted to one or more computing devices for further processing and use. For example, incomplete stratigraphic picks data associated with one or more wells can be identified and updated appropriately in advance of being added to a database.

Figure 1:
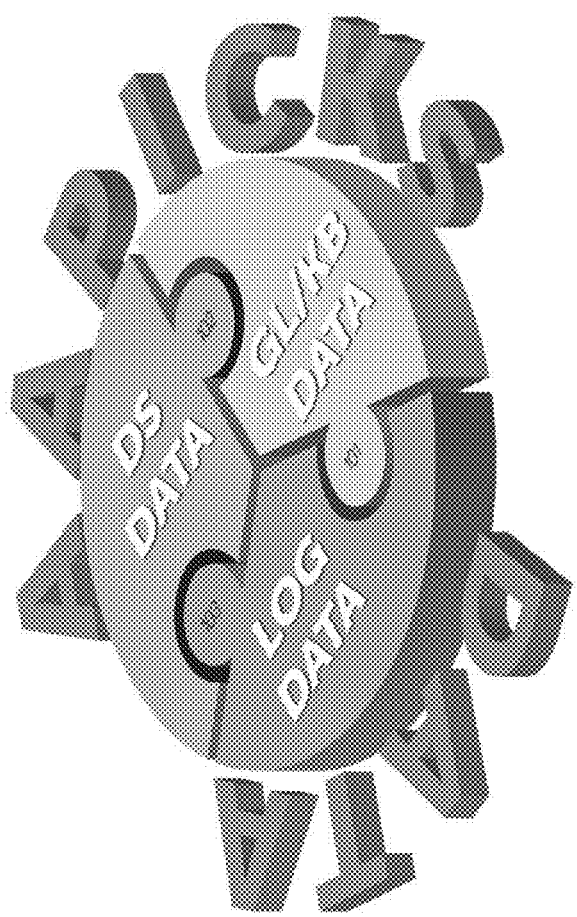
FIG. 1 is a block diagram that represents types of stratigraphic picks data.

Referring now to FIG. 1, a block diagram is shown that represents types of stratigraphic picks data. The block diagram shown in FIG. 1 represent an integration of log, deviation survey, and ground level data, which allow for selection and loading of approved picks. in one or more implementations, instructions stored on processor readable media, e.g., non-transitory processor readable media, can be executed by one or more processors to configure the processor(s) to identify missing or incorrect data. For example, data that regard well reference elevation (101), including ground level ("GL"), kelly bushing ("KB"), or other suitable aspect that is usable to determine or represent an elevation can be received and analyzed. Furthermore and prior to loading data to one or more production databases, deviation survey data (102) can be received and processed in accordance with the teachings herein.

In operation, core data and log data that are associated with thousands of completed wells can be collated from various databases, including databases that are or previously were in production. For example, log data (103) (e.g., including gamma, neutron, density, sonic, and resistivity) can be used to generate approved picks. Newly approved layers can be updated in a database promptly and regularly, including by classifying and naming data in compliance with conventions defined by a stratigraphic nomenclature group.

As used herein, the term "core data" generally refers to information representing a cylindrical sample of a geologic formation, such as reservoir rock, that is taken during or after drilling a well. Core data can represent core samples that can be full-diameter cores, that is, nearly as large in diameter as a respective drill bit taken at the time of drilling the zone. Core samples can be also in the form of sidewall cores, which are generally less than one inch (2.5 cm) in diameter taken after a hole has been drilled. Cores samples can be used for many studies, including relating to drilling fluids and damage done by them. Core Data can be used for calibration of well logs, as well as to reveal variations in reservoir properties that might be undetectable through downhole logging measurements alone. Further, analysts use cores to characterize pore systems in the rock and model reservoir behavior to optimize production based on the analysis of core porosity, permeability, fluid saturation, grain density, lithology and texture.

As used herein, the term "log data" generally refers to a continuous measurement of formation properties accomplished by lowering electrically powered instruments to measure downhole rock properties and make decisions about drilling and production operations. The main purposes of well logging can include providing data for evaluating petroleum reservoirs, aiding in testing, completion, and repairing of the well, and to properly integrate with actual rock samples that are collected from the wellbore, such as cuttings, sidewall cores and core samples.

Figure 2:
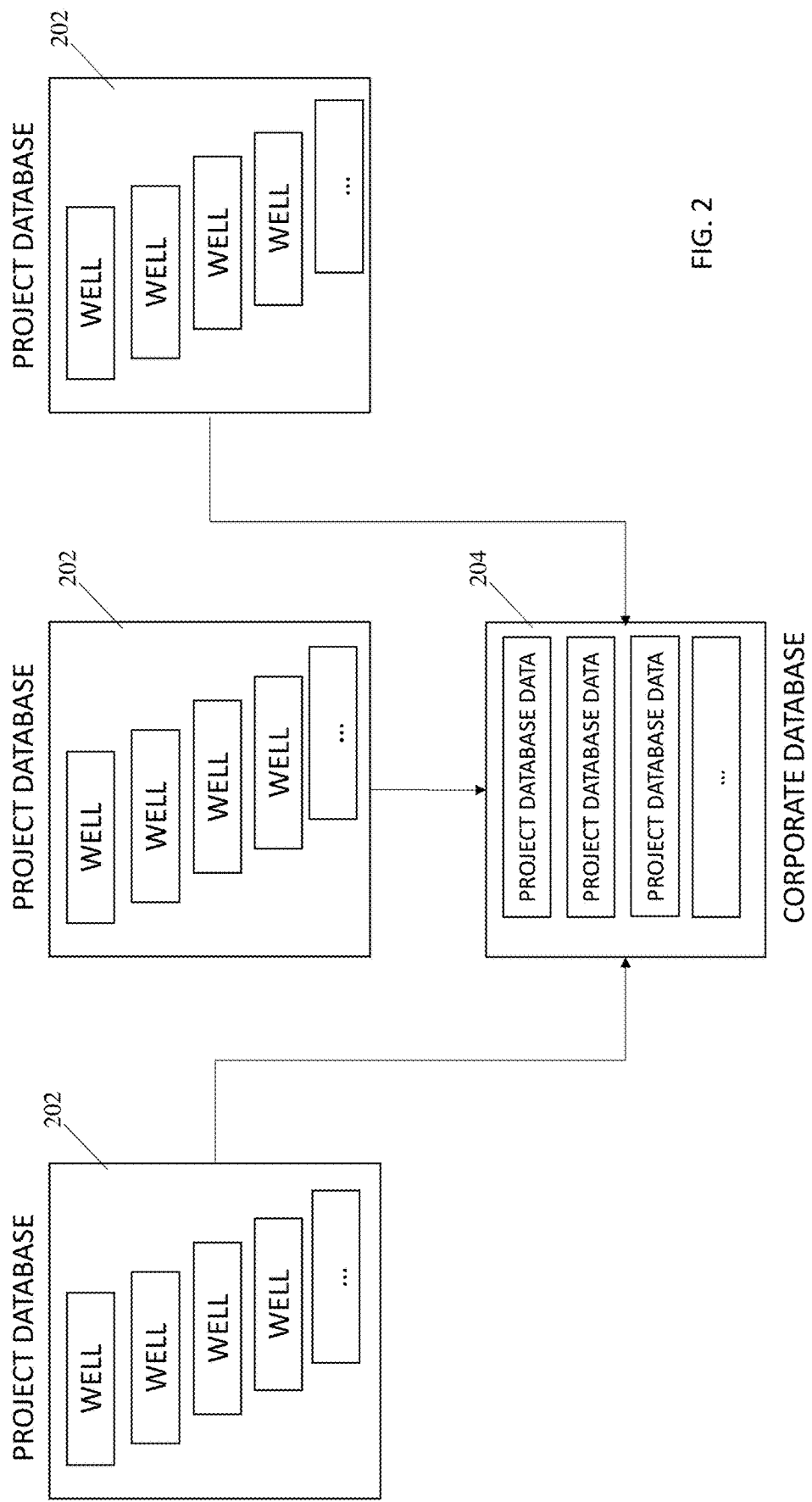
FIG. 2 is a simple block diagram illustrating example databases in accordance with an implementation of the present disclosure, including a plurality of project databases and a corporate database.

FIG. 2 is a simple block diagram illustrating example databases in accordance with an implementation of the present disclosure, including a plurality of project databases 202 and a corporate database 204. Project databases 202 can include information associated with stratigraphic picks data associated with a plurality of wells. For example, information stored in project databases 202 can include project names, well names, and various nomenclature and other information associated with geologic exploration. Information from respective project databases 202 can be processed and stored in corporate database 204, including as shown and described herein.

Various data processing is supported to implement the teachings herein. Examples of data processing include applying unique observation numbers to differentiate multiple depths for a single stratigraphic pick layer and wellbore. Moreover, picks depth data can be filtered, for example, to ensure that each record includes a respective depth that lies between the kick off point, as known in the art, and up to, but not including, total depth for completed wellbores in a respective database. One or more data reports can be generated that detail success or failure of processing a respective set of picks data. Successfully processed picks data that have been loaded from a data source, such as a project database 202 over a data communication network or a locally stored data file (e.g., a MICROSOFT EXCEL spreadsheet) that contains stratigraphic picks data, data can be transferred automatically to a corporate database 204. Thus, the present disclosure provides improved technologies for automatically migrating correct and accurate stratigraphic picks data from one or more project databases 202 to a corporate database 204.

Instructions can be stored on processor readable media that, when executed, configure one or more computing devices to apply filtering to ensure that data from one or more respective operational project databases 202 comply with respective conditions prior to being processed and/or migrated. For example, data are filtered for records that include information representing a respective source (e.g., "AAP"). Filtering can be based on other values, as well, such as relating to well names, observation numbers, or other suitable criteria. Data records that do not satisfy a respective condition can be eliminated as a function of filtering. In addition to filtering based on data values, filtering can occur based on various criteria. For example, filtering can be used to ensure duplicate records are not processed and/or migrated to one or more databases. Other data filtering criteria are supported, such as ensuring that only stratigraphic picks data representing depths between a wellbore's kick off point, as known in the art, and the wellbore's total depth are selected.

Other preprocessing can include filtering data to ensure records identify wells associated with respective stratigraphic picks data that have an associated reference elevation, have an associated interpreter id, have a pick depth that is between the top and bottom depth of the associated wellbore, or have recognized observation numbers. Such preprocessing can occur, for example, via executing programming statements (e.g., VISUAL BASIC) and database functionality (e.g., SQL).

Once filtering processes are complete, obsolete stratigraphic picks data for relevant wellbores previously stored in a corporate database 204 are deleted. Instructions stored on processor readable media can be executed by one or more computing devices then cause appropriate stratigraphic picks data to be processed and transmitted ("migrated") to one or more database 204. Further, detailed data reports can be generated, such as in MICROSOFT EXCEL spreadsheets, that identify stratigraphic picks data that were successfully processed and/or successfully loaded.

Following preprocessing, one or more processes can be performed to remove records in a production database (e.g., corporate database 204) to be replaced with processed records from one or more projects databases 202. Error checking can occur to ensure records have successfully been deleted and, provided no error is discovered, new stratigraphic picks data can be transferred to the corporate database 204. Records that are successfully transferred can be noted as such, and failures forwarded for further investigation, and one or more data reports can be generated.

Figure 3:
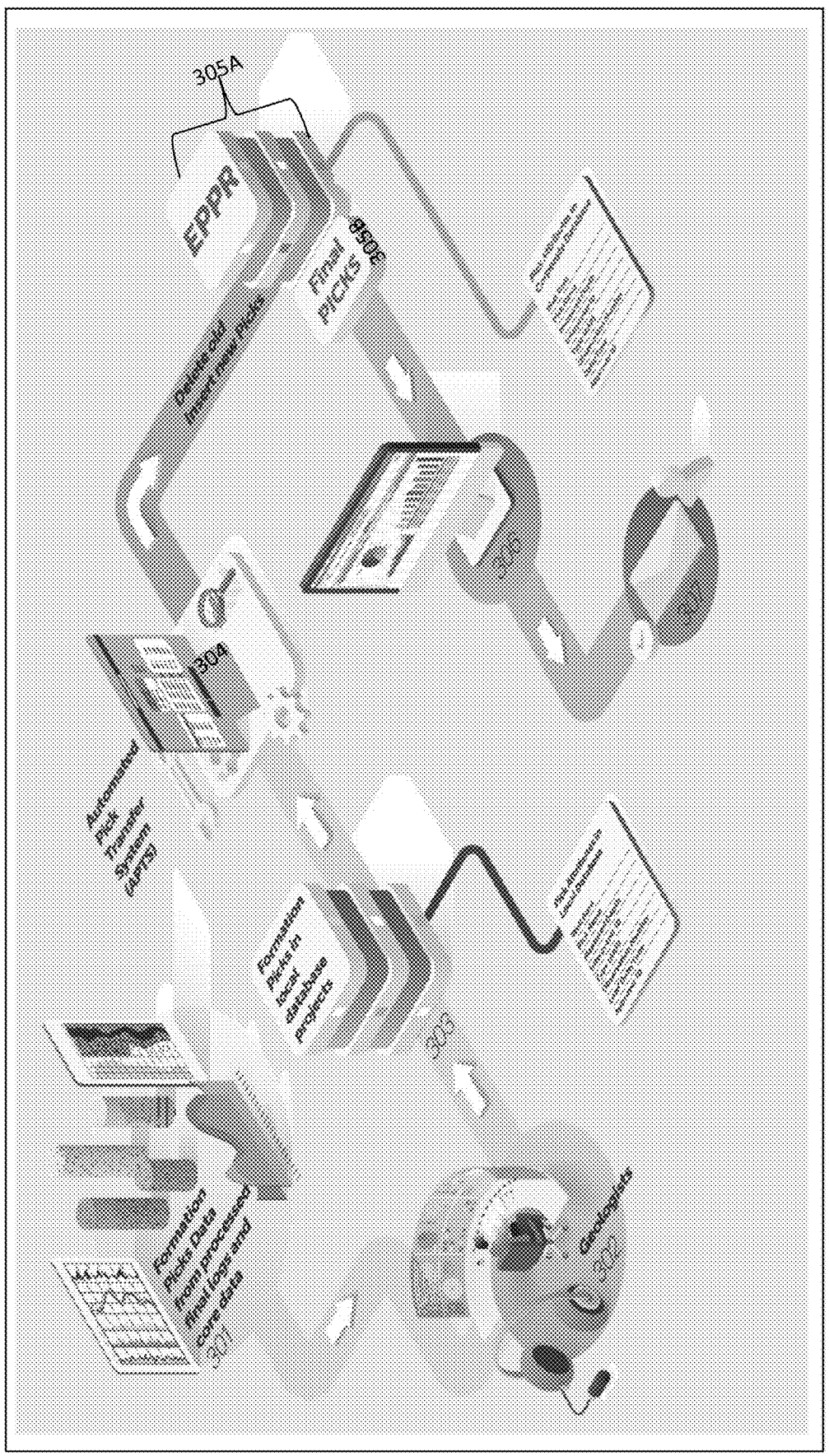
FIG. 3 is a flow diagram illustrating steps associated with an example process in accordance with an implementation of the present disclosure.

FIG. 3 is a flow diagram illustrating steps associated with an example process in accordance with an implementation of the present disclosure. It is to be appreciated that several of the logical operations described herein can be implemented as a sequence of computer-implemented acts or program modules running on one or more computing devices. Accordingly, the operations described herein, including logical operations, are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In accordance with the algorithmic steps in the example high-level process shown in FIG. 3, stratigraphic picks data ("formation picks data") associated with thousands of completed wells are collated from various project databases 202 and loaded (step 301). At step 302, rules, including rules that were defined with assistance of geologists or other subject matter experts, are implemented to process the stratigraphic picks data for migration from a project database 202. Thereafter, formation picks from project databases 202 are analyzed and filtered for compliance with respective rules and conditions set forth in step 302 (step 303). Example conditions relate to various data attributes, including wellbores, pick names, measurement depth, interpreter ID, type (e.g., "AAP"), observation number, local date/time, and approval ID. After data are processed, filtered data can be transferred for inclusion in a corporate database 204 (step 304). Thereafter, corresponding data from a corporate database 202 that are obsolete can be deleted (step 305A) and replaced with new processed stratigraphic picks for providing final stratigraphic picks data (step 305B). Thereafter, a detailed report can be generated to identify successfully loaded picks such as to be marked as "Success" (step 306). Any errors that are identified can be detailed for further analysis. Results can be transmitted, such as by email, to respective users (step 307). Thus, as shown in FIG. 3 and described above, stratigraphic picks data can be compiled, processed, and loaded from project databases 202 and into corporate database 204.

In an alternative implementation, stratigraphic picks data can be imported from one or more data files (e.g., a MICROSOFT EXCEL spreadsheet) to corporate database 204. In this alternative implementation, connections from project databases 202 to corporate database 204 are eliminated. Processing and migrating large amounts of data via a MICROSOFT EXCEL spreadsheet or other data file, as opposed to accessing databases 202 over a data communication network, provides for efficiently handling data relating to loading stratigraphic picks data. For example, information can be received from subject matter is used to ensure that comprehensive stratigraphic picks data that comply with filtering criteria picks are available, for example, in an Excel spreadsheet following well completion.

In one or more implementations, program instructions can be executed by one or more computing devices to provide options for a user to select an existing data file (e.g., a MICROSOFT EXCEL spreadsheet) prior to logging in. Thereafter, graphical screen controls are available for a user to implement transfer processes. Preprocessing, such as described herein, can be implemented, such as to ensure no duplicate data are entered, to ensure that data representing stratigraphic data picks having associated wells with a reference elevation, whether the data represent picks having an interpreter name, and whether corresponding pick depth is between the top and bottom depth of the associated wellbore. Once corresponding data quality control process(es) are completed, the process of loading picks can be initiated. Records that are successfully transferred can be noted as such, for example, in a data report, and failures forwarded for further investigation, and one or more data reports can be generated. Further, users can be alerted with information, such as by regular email notifications, regarding processes shown and described herein.

In an example operation, stratigraphic picks data that satisfy various criteria (e.g., identifying "AAP") from well logs and core data sheets can be saved in data file. The data are then migrated from the Excel spreadsheet and loaded into the corporate database 204. The attributes on the data file can include the well name, wellbore name, measured depth, pick names, an interpreter's network id, observation number, and respective approver name. The data can correspond to value(s) in a data field, for example, such as an individual well or multiple wells. Furthermore, a corresponding data report can be generated for review and approval before or after data have been transferred to the corporate database 204.

In one or more implementations of the present disclosure, one or more computing devices evaluate stratigraphic picks data, such as from one more project databases 202, to ensure the particular conditions are met. Wellbore data are checked to exist in the corporate database 204. Further, duplicate data are prohibited. Wellbore data are checked to include reference elevation data, and information representing pick depth must fall between kickoff depth and wellbore total depth. Further, data are checked for inclusion of an interpreter name, and picks depth must have a matching depth in a depth lookup table. Moreover, a check is performed whether the pick layers have observation numbers. The results of these checks can return, for example, a response of "success" or "failure."

Figure 4:
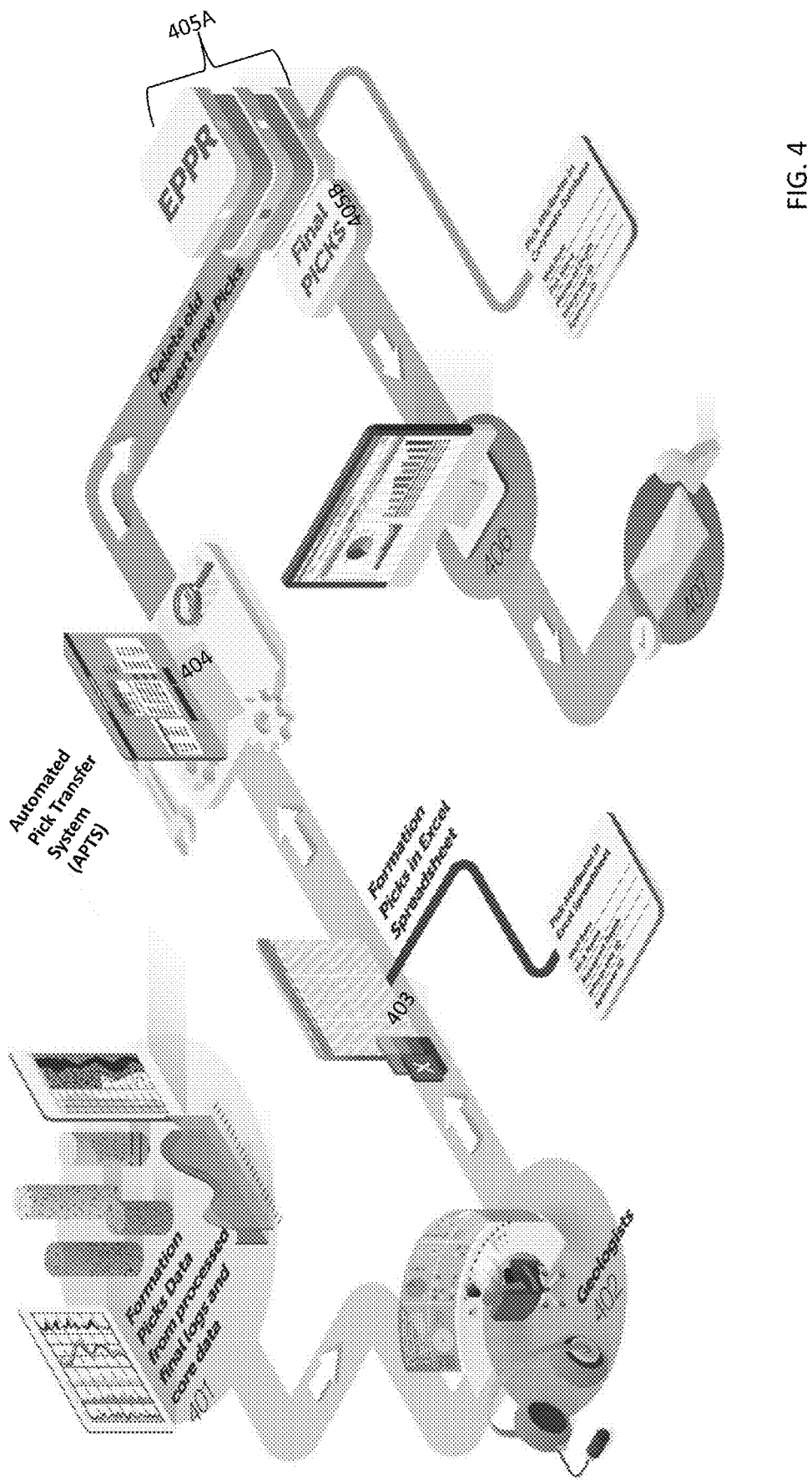
FIG. 4 is a flow diagram illustrating steps associated with an example process in accordance with an implementation of the present disclosure in which data are processed from one or more data files.

FIG. 4 is a flow diagram illustrating steps associated with an example process in accordance with an implementation of the present disclosure in which data are processed from one or more data files (e.g., MICROSOFT EXCEL spreadsheets). In accordance with the algorithmic steps in the example high-level process shown in FIG. 4, stratigraphic picks data ("formation picks data") associated with thousands of completed wells are collated from various project databases 202 and loaded (step 401). At step 402, users, such as geologists or other pick subject matter experts make the approved picks available in the project database. Thereafter, formation picks stored in a data file are analyzed and filtered for compliance with respective conditions (step 403). Example conditions relate to various data attributes, including wellbores, pick names, measurement depth, interpreter ID, type (e.g., "AAP"), observation number, local date/time, and approval ID. After data are filtered and connected, error checking can be performed (step 404). Thereafter, corresponding data from a corporate database 202 that are obsolete can be deleted (step 405A) and replaced with new processed stratigraphic picks for providing final stratigraphic picks data (step 405B). Thereafter, a detailed report can be generated to identify successfully loaded picks such as to be marked as "Success" (step 406). Any errors that are identified can be detailed for further analysis. Results can be transmitted, such as by email, to respective users (step 407). Thus, as shown in FIG. 4 and described above, stratigraphic picks data can be compiled, processed, and loaded from one or more data files and into corporate database 204.

The present disclosure provides processing information for timely and accurate updating of a corporate database 204. For example, the processes set forth herein addresses loss due to wrong or incomplete approved picks data. For example, inaccurate stratigraphic picks data can cause inaccurate maps to be generated, which results in wrong grid data, which can lead to wrong well planning, and wrong well placement. This present disclosure minimizes errors in stratigraphic picks data, while simultaneously minimizing accuracy and time for processing and completion. Tasks that could require hours can be completed in minutes, and operations can operate during business hours as opposed to running off-hours (e.g., overnight).

In accordance with one or more implementations, newly approved data layers (e.g., as set forth by a Stratigraphic Nomenclature Group) in the corporate database 204 are updated promptly for data completeness. A user interface is available that includes graphical screen controls, such as drop-down lists, textboxes, buttons, checkboxes, or the like, that enable a user to load stratigraphic picks data from a respective project database 202 or data file (e.g., MICROSOFT EXCEL spreadsheet). Once selected, data can be retrieved, such as be searching project name, field name and/or well name. Data selection and processing can occur for migrating stratigraphic picks data automatically from one or more project databases 202. More particularly, contents of respective stratigraphic picks data analyzed to ascertain whether attributes associated therewith are arranged according to the predetermined standards, and that records complying with filtering criteria (e.g., respective data representing picks having depths between the wellbores' kick off point and total depth). Thereafter, existing data in a corporate database 204 can be deleted for relevant purposes and data from the data file (e.g., the MICROSOFT EXCEL spreadsheet) that comply with the respective criteria for the relevant wellbores are loaded into the project database 202. Any data representing remaining picks that contain errors, do not comply with respective criteria, or otherwise not in condition to be added to the corporate database 204 can be flagged with one or more error messages for further analysis. Records that are successfully transferred can be noted as such, for example, in a data report, and failures forwarded for further investigation, and one or more data reports can be generated.

Figure 5:
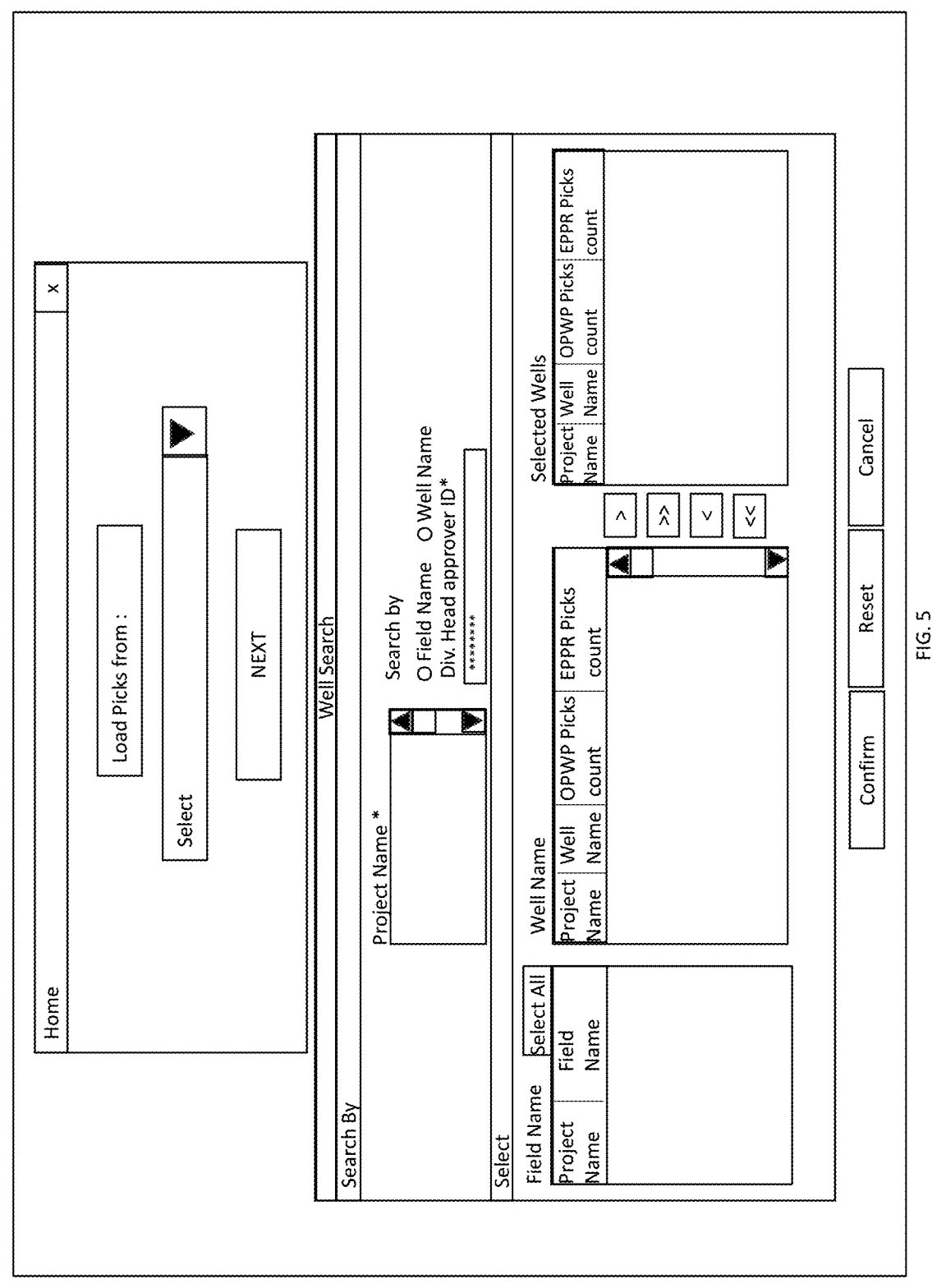

In one or more implementations of the present disclosure, computer instructions can be generated that, when executed by one more computing devices, provide a graphical user interface that includes one or more options for a user to choose a project prior to the user logging in by submitting authorization information. Other options can be provided, including to enable a user to log in to multiple databases simultaneously, to provide one or more user interfaces for selecting a respective project and to select from a list of field or well names (FIG. 5). Following a user selection, one or more options can be provided to implement a data transfer process.

Figure 6:
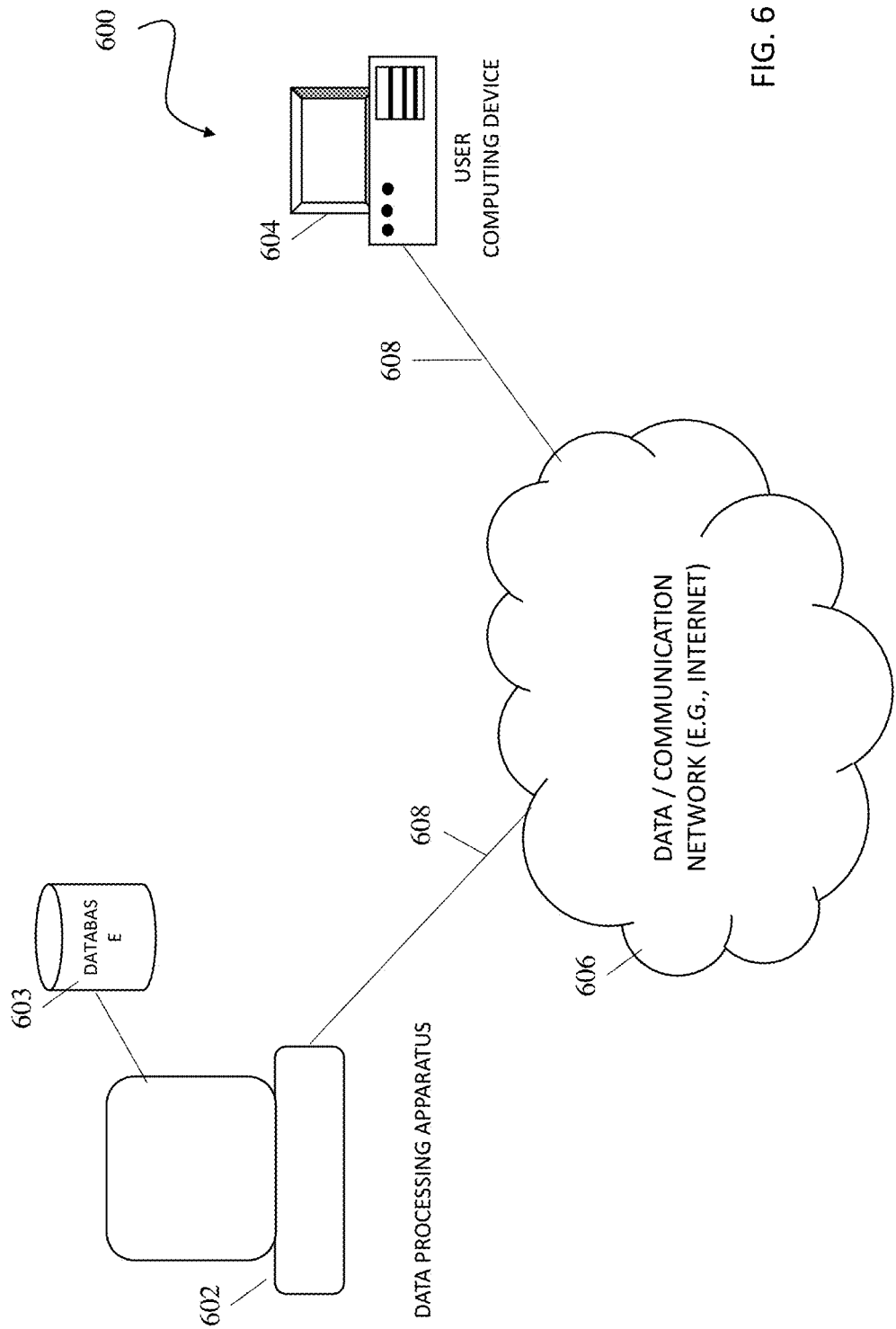
FIG. 6 is a block diagram that shows an example hardware arrangement that operates for providing the systems and methods disclosed herein.

Referring to FIG. 6, a diagram is provided that shows an example hardware arrangement that operates for providing the systems and methods disclosed herein and designated generally as system 600. System 600 can include one or more information processors 602 that are at least communicatively coupled to one or more user computing devices 604 across communication network 606. Information processors 602 and user computing devices 604 can include, for example, mobile computing devices such as tablet computing devices, smartphones, personal digital assistants or the like, as well as laptop computers and/or desktop computers, server computers and mainframe computers. Further, one computing device may be configured as an information processor 602 and a user computing device 604, depending upon operations being executed at a particular time.

With continued reference to FIG. 6, information processor 602 can be configured to access one or more databases 603 for the present disclosure, including source code repositories and other information. However, it is contemplated that information processor 602 can access any required databases via communication network 606 or any other communication network to which information processor 602 has access. Information processor 602 can communicate with devices comprising databases using any known communication method, including a direct serial, parallel, universal serial bus ("USB") interface, or via a local or wide area network.

User computing devices 604 can communicate with information processors 602 using data connections 608, which are respectively coupled to communication network 606. Communication network 606 can be any communication network, but typically is or includes the Internet or other computer network. Data connections 608 can be any known arrangement for accessing communication network 606, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 604 preferably have the ability to send and receive data across communication network 606, and are equipped with web browsers, software disclosures, or other means, to provide received data on display devices incorporated therewith. By way of example, user computing device 604 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 606, and that wireless communication can be provided between wireless devices and information processors 602.

System 600 preferably includes software that provides functionality described in greater detail herein, and preferably resides on one or more information processors 602 and/or user computing devices 604. One of the functions performed by information processor 602 is that of operating as a web server and/or a web site host. Information processors 602 typically communicate with communication network 606 across a permanent i.e., un-switched data connection 608. Permanent connectivity ensures that access to information processors 602 is always available.

Figure 7:
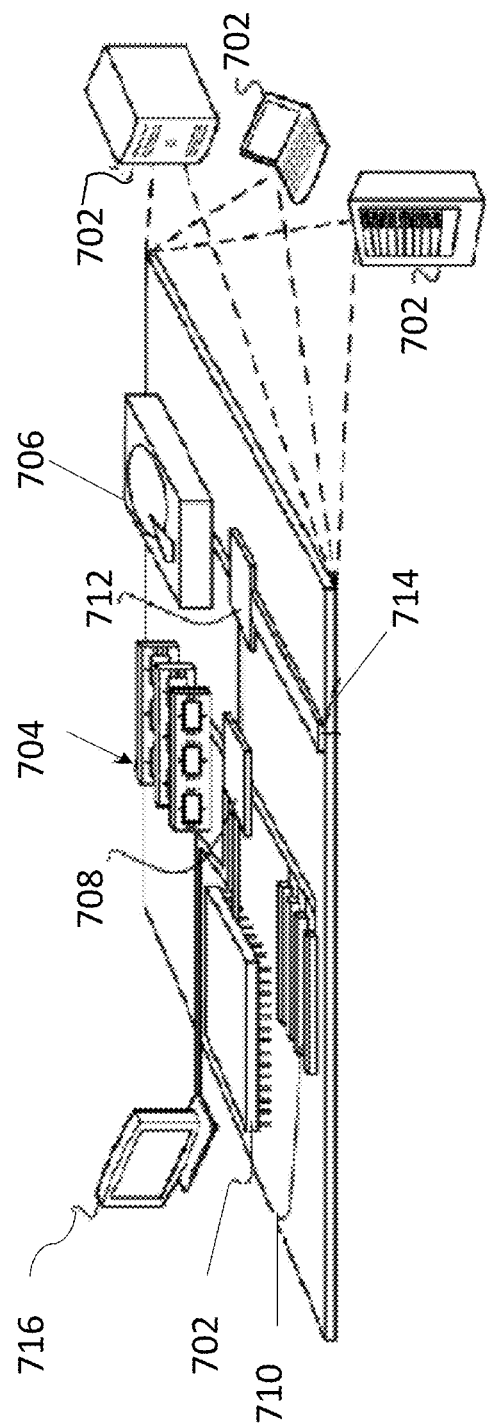
FIG. 7 shows an example of an information processor that can be used to implement the techniques described herein the present disclosure.

FIG. 7 shows an example information processor 602 that can be used to implement the techniques described herein. The information processor 602 is intended to represent various forms of digital computers, such as laptops, desktops, workstations, personal digital assistants, servers, blade servers, mainframes, and other appropriate computers. The components shown in FIG. 7, including connections and relationships, and their functions, are meant to be exemplary only, and are not meant to limit implementations of the inventions described and/or claimed in this document.

The information processor 602 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the information processor 602, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 704 stores information within the information processor 602. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the information processor 602. In some implementations, the storage device 706 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 can be configured to manage bandwidth-intensive operations, while the low-speed interface 712 can be configured to manage lower bandwidth-intensive operations. Of course, one of ordinary skill in the art will recognize that such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In an implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 602 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, an disclosure program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, a disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A computer-implemented method for processing and migrating stratigraphic picks data, the method comprising:
providing, by at least one computing device configured by executing instructions, a graphical user interface that includes selectable options associated with each of a plurality of projects as well as field names or well names associated with each of the projects;
receiving, by the at least one computing device via the graphical user interface, information associated with at least one first database storing stratigraphic picks data;
automatically accessing, by the at least one computing device as a function of the information received via the graphical user interface, the stratigraphic picks data from the at least one first database;
processing, by the at least one computing device, the stratigraphic picks data from the at least one first database to determine data conditions including that the stratigraphic picks data represent wells having an associated reference elevation and having a pick depth that is between a top and bottom depth of an associated wellbore;
filtering, by the at least one computing device, the stratigraphic picks data by removing at least some of the stratigraphic picks data that does not conform with at least one of the plurality of the data conditions to generate filtered stratigraphic picks data;
identifying, by the at least one computing device, at least some data in a second database that matches at least some of the filtered stratigraphic picks data;
processing, by the at least one computing device, the identified at least some data to remove the identified at least some data from the second database;
processing, by the at least one computing device, the filtered stratigraphic picks data to add migrate the filtered stratigraphic picks data to the second database; and
generating, by the at least one computing device, a report identifying any of the filtered stratigraphic picks data that were successfully added to the second database and any of the stratigraphic picks data that were not successfully added to the second database.

2. The method of claim 1, further comprising:
updating, by the at least one computing device, at least some of the stratigraphic picks data with information missing in the at least some of the stratigraphic picks data.

3. The method of claim 2, wherein the information includes at least one of reference elevation information and deviation survey data.

4. The method of claim 1, wherein the stratigraphic picks data includes information representing a sample of a geologic formation that is taken during or after drilling a well.

5. The method of claim 1, wherein the filtering further comprises removing, by the at least one computing device, duplicate stratigraphic picks data.

6. The method of claim 1, wherein the stratigraphic picks data are accessed by the at least one computing device from the at least one database over a data communication network.

7. The method of claim 1, wherein the stratigraphic picks data are accessed by the at least one computing device from a data file.

8. The method of claim 1, wherein processing the identified at least some data to remove the identified at least some data from the second database further comprises:
determining, by the at least one computing device, an error that occurred in the second database; and
generating, by the at least one computing device, a report identifying the error.

9. The method of claim 1, wherein processing the filtered stratigraphic picks data to add the filtered stratigraphic picks data to the second database further comprises:
- determining, by the at least one computing device, an error that occurred in the second database; and
- generating, by the at least one computing device, a report identifying the error.

10. The method of claim 1, wherein the plurality of data conditions further include:
- no duplicate stratigraphic picks data;
- any of the stratigraphic picks data has an interpreter id; and
- an observation number associated with respective stratigraphic picks data is recognizable.

11. A computer-implemented system for processing stratigraphic picks data, the system comprising:
- at least one computing device comprising a processor having access to instructions on non-transitory processor readable media that, when executed by the at least one computing device, configure the at least one computing device to:
  - provide a graphical user interface that includes selectable options associated with each of a plurality of projects as well as field names or well names associated with each of the projects;
  - receive, via the graphical user interface, information associated with at least one first database storing stratigraphic picks data;
  - automatically access, as a function of the information received via the graphical user interface, the stratigraphic picks data from the at least one first database;
  - process the stratigraphic picks data from the at least one first database to determine data conditions including that the stratigraphic picks data represent wells having an associated reference elevation and having a pick depth that is between a top and bottom depth of an associated wellbore;
  - filter the stratigraphic picks data by removing at least some of the stratigraphic picks data that does not conform with at least one of the plurality of the data conditions to generate filtered stratigraphic picks data;
  - identify at least some data in a second database that matches at least some of the filtered stratigraphic picks data;
  - process the identified at least some data to remove the identified at least some data from the second database;
  - process the filtered stratigraphic picks data to migrate the filtered stratigraphic picks data to the second database; and
  - generate a report identifying any of the filtered stratigraphic picks data that were successfully added to the second database and any of the stratigraphic picks data that were not successfully added to the second database.

12. The system of claim 11, wherein the at least one computing device has access to instructions on non-transitory processor readable media that, when executed by the at least one computing device, further configure the at least one computing device to:
- update at least some of the stratigraphic picks data with information missing in the at least some of the stratigraphic picks data.

13. The system of claim 12, wherein the information includes at least one of reference elevation information and deviation survey data.

14. The system of claim 11, wherein the stratigraphic picks data includes information representing a sample of a geologic formation that is taken during or after drilling a well data and log data.

15. The system of claim 11, wherein the filtering further comprises removing, by the at least one computing device, duplicate stratigraphic picks data.

16. The system of claim 11, wherein the stratigraphic picks data are accessed by the at least one computing device from the at least one database over a data communication network.

17. The system of claim 11, wherein the stratigraphic picks data are accessed by the at least one computing device from a data file.

18. The system of claim 11, wherein processing the identified at least some data to remove the identified at least some data from the second database further comprises:
- determining, by the at least one computing device, an error that occurred in the second database; and
- generating, by the at least one computing device, a report identifying the error.

19. The system of claim 11, wherein processing the filtered stratigraphic picks data to add the filtered stratigraphic picks data to the second database further comprises:
- determining, by the at least one computing device, an error that occurred in the second database; and
- generating, by the at least one computing device, a report identifying the error.

20. The system of claim 11, wherein the plurality of data conditions further include:
- no duplicate stratigraphic picks data;
- any of the stratigraphic picks data has an interpreter id; and
- an observation number associated with respective stratigraphic picks data is recognizable.

* * * * *